United States Patent [19]

Malafouris

[11] 4,167,175

[45] Sep. 11, 1979

[54] SELF-EXTINGUISHING HIBACHI-TYPE GRILL COMBINATION

[75] Inventor: Dannie O. Malafouris, Portland, Oreg.

[73] Assignee: Barbecue Time, Inc., Portland, Oreg.

[21] Appl. No.: 762,051

[22] Filed: Jan. 24, 1977

[51] Int. Cl.² .................. A47J 37/00; F24B 3/00; F24C 1/16

[52] U.S. Cl. .................. 126/25 C; 126/9 R; 126/25 R; 150/52 R; 150/2.2; 190/48

[58] Field of Search .................. 126/25 C, 9 R, 25 R, 126/25 B; 150/52 R, 3, 2.1, 2.2; 190/48

[56] References Cited

U.S. PATENT DOCUMENTS

| 1,238,914 | 9/1917 | Hilliard | 150/52 R |
|---|---|---|---|
| 1,387,597 | 8/1921 | Fetters | 150/52 R X |
| 2,693,259 | 11/1954 | Amick | 150/52 R X |
| 2,960,136 | 11/1960 | Ziff | 190/48 X |
| 3,292,748 | 12/1966 | Rifkin | 150/3 X |
| 3,428,103 | 2/1969 | Walsh | 150/2.2 |
| 3,606,066 | 9/1971 | Anderson | 126/25 C X |
| 3,976,046 | 8/1976 | Morton et al. | 126/25 C |
| 3,990,495 | 11/1976 | LaBarba | 150/2.2 |
| 4,046,132 | 9/1977 | White | 126/9 R |

Primary Examiner—William F. O'Dea
Assistant Examiner—Harold Joyce
Attorney, Agent, or Firm—Eugene D. Farley

[57] ABSTRACT

A self-extinguishing grill combination comprises an hibachi-type grill and a substantially air-tight pouch dimensioned to receive the grill with its charge of burning solid fuel. The pouch has an opening sized to pass the grill. The opening is provided with a substantially air-tight closure adjustable between open and closed positions. The grill with its charge of burning fuel is inserted into the pouch through the opening after which the opening is sealed with the closure, thereby sealing off the pouch interior and extinguishing the burning fuel.

1 Claim, 5 Drawing Figures

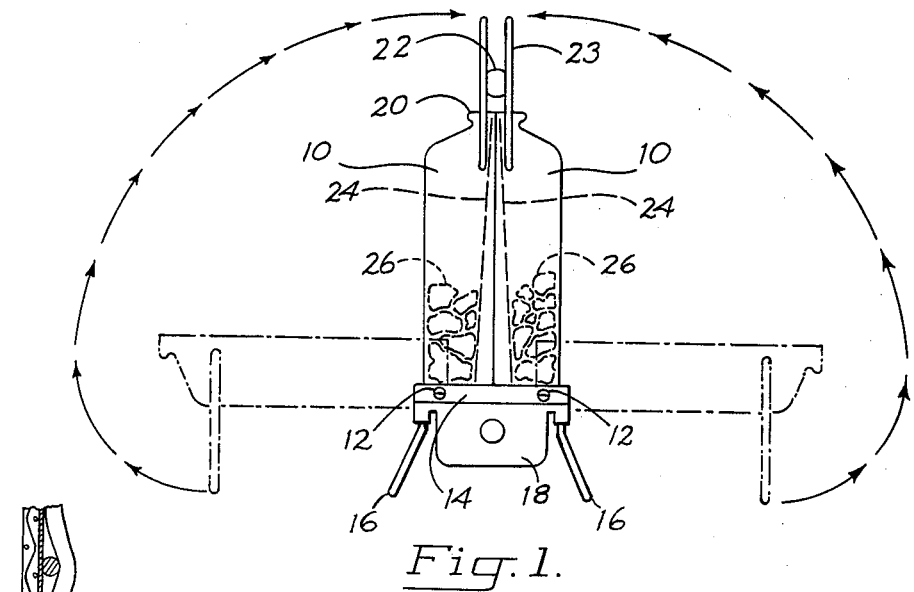
Fig. 1.
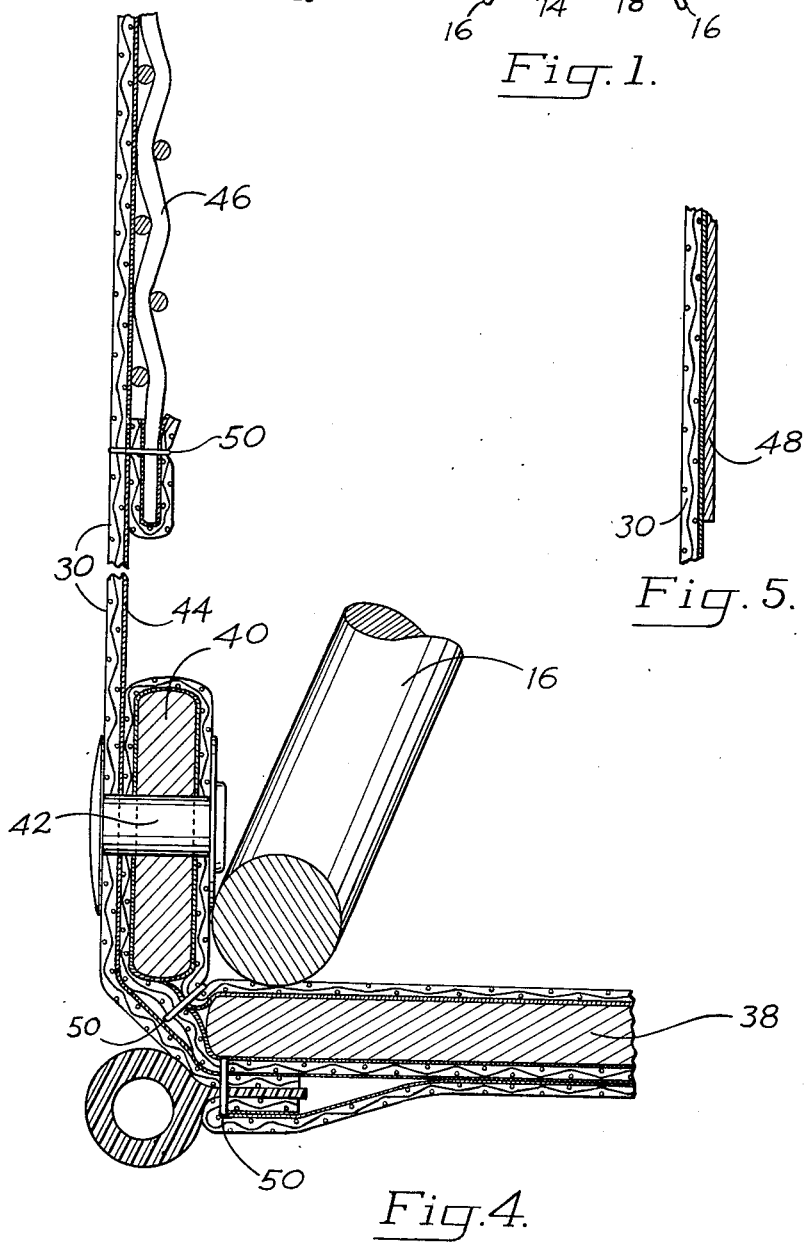
Fig. 5.
Fig. 4.

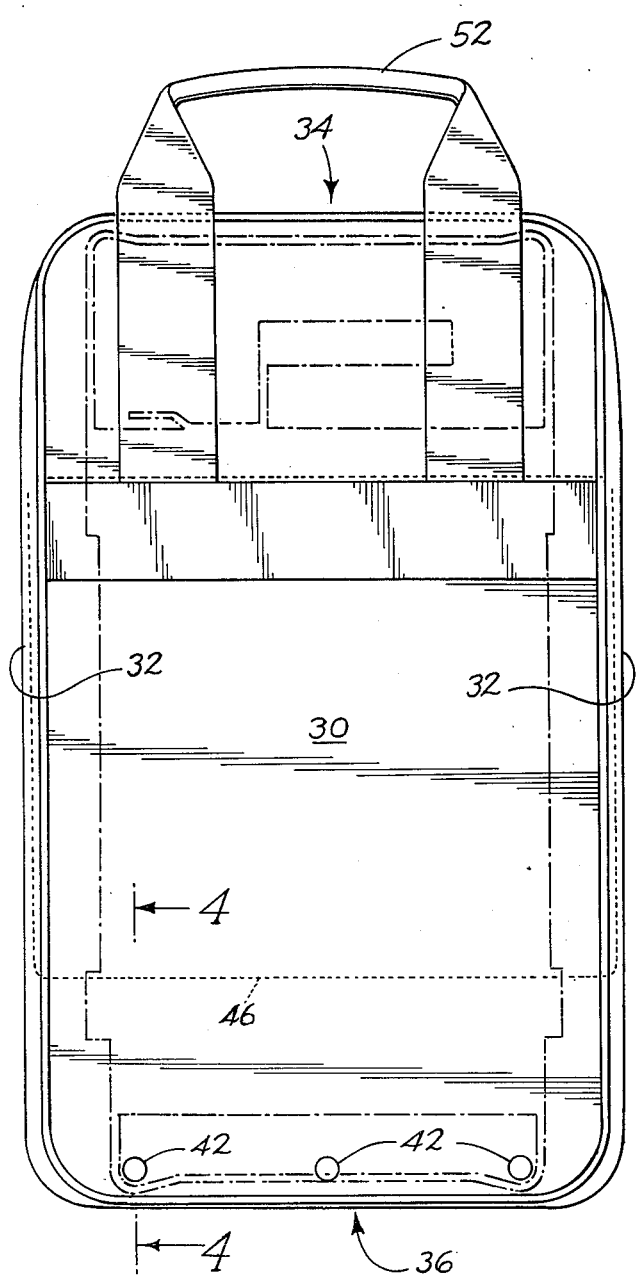
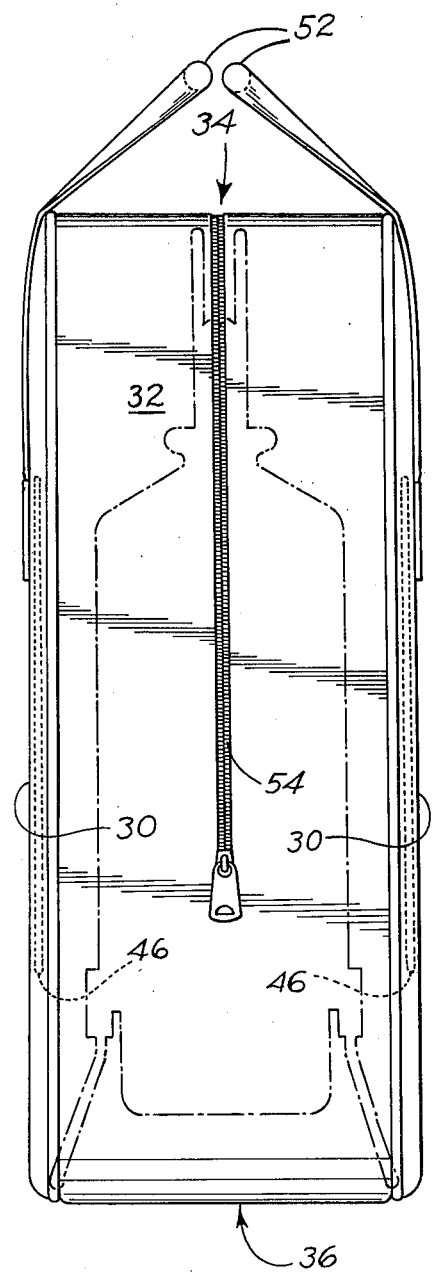
Fig. 2.
Fig. 3.

SELF-EXTINGUISHING HIBACHI-TYPE GRILL COMBINATION

BACKGROUND AND GENERAL STATEMENT OF THE INVENTION

This invention pertains to hibachi-type grills. It pertains particularly to an hibachi-type grill-pouch combination which enables snuffing out of the burning fuel charged to the grill.

The invention pertains particularly to hibachi-type grills of the class disclosed and claimed in the co-pending application of Dannie O. Malafouris, Ser. No. 743,848, filed Nov. 22, 1976, now U.S. Pat. No. 4,133,335 and is described and illustrated with particular reference to a grill of this class although the invention is also applicable for use with other classes of grills.

The enjoyable and practical uses of hibachi-type grills are to some extent diminished by the fact that where the grill is used in a first location and thereafter transported to a second location, a substantial period of time must elapse before the grill cools down sufficiently to be carried. Additionally, the person carrying the grill runs the hazard of being burned. Also, the grill is heavy and rather clumsy to carry, particularly when it still is hot.

As a partial solution to the foregoing problems it is conventional practice either to let the fuel burn out entirely, or to dump it in a partially burned condition prior to letting the grill cool. This procedure has the obvious economic disadvantage of wasting a good proportion of the relatively expensive charcoal briquets normally used as a solid fuel.

It accordingly is the general purpose of the present invention to provide an hibachi-type grill combination which is self-extinguishing so that the burning fuel contents of the grill may be snuffed out in a time period of three or four minutes.

It is another object of the present invention to provide an hibachi-type grill combination which may be carried easily, safely, and comfortably without danger of burning the person carrying the grill.

Still a further object of the present invention is the provision of an hibachi-type grill combination which, by extinguishing the burning solid fuel before it is completely consumed, preserves the unconsumed portion of the fuel for future use.

Still other objects of the present invention are the provision of a pouch-type container for extinguishing and carrying hibachi-type grills as well as a method for extinguishing the burning solid fuel contents thereof.

I have discovered that the foregoing and other objects may be achieved by the provision of the combination of an hibachi-type grill including at least one fuel tray having an overlying solid-fuel-retainer cooking support, and a substantially air-tight pouch dimensioned to receive the grill with burning solid fuel in the tray retained, therein by the cooking support.

The pouch has an opening sized to pass the grill. The opening is provided with a substantially air-tight closure adjustable between an open position for reception of the grill with its content of burning solid fuel and a closed position for substantially sealing off the pouch interior with the grill contained therein. This extinguishes the burning fuel by depriving it of combustion air.

Broadly considered, the method described herein for extinguishing the burning solid fuel in an hibachi-type grill comprises first providing a fire-resistant, substantially air-tight pouch having an opening dimensioned to pass the grill and provided with a substantially air-tight closure adjustable between open and closed positions. The closure first is adjusted to its open position. Next the grill is placed with its content of burning fuel inside the pouch. Finally the closure is adjusted to its closed position sealing off the pouch from access of air and thereby extinguishing the burning fuel.

DESCRIPTION OF PREFERRED EMBODIMENTS OF THE INVENTION

The hereindescribed self-extinguishing hibachi-type grill combination is illustrated in the accompanying drawings, wherein:

FIG. 1 is a view in end elevation of an hibachi-type grill of the class with which the present invention is concerned;

FIGS. 2 and 3 are views in side and end elevation, respectively, of a pouch used to contain the grill and to extinguish the burning solid fuel with which the grill is charged;

FIG. 4 is an enlarged, detail, fragmentary, sectional view taken along line 4—4 of FIG. 2; and FIG. 5 is an enlarged, fragmentary detail sectional view similar to FIG. 4 and illustrating an alternate form of the invention.

The hibachi-type grill illustrated in FIG. 1 is particularly well suited for use in the practice of the present invention. It is of the general class of hibachi grills set forth and described in the aforesaid patent application of Malafouris, Ser. No. 743,848, now U.S. Pat. No. 4,133,335

The component parts of the grill which are of particular importance in connection with the present invention are a pair of dished fuel trays 10 connected by means of pivot pins 12 to a base 14.

Base 14 mounts supporting legs 16 and a sliding ash tray 18.

The outer ends of fuel trays 10 mount a sliding damper 20 with associated handle 22.

Trays 10 also mount at their upper ends a pair of pivotally mounted members 23 which serve as handles in their upright position and as legs or supports in their transverse position, FIG. 1.

A pair of cooking grates 24, which normally are perforated, overlie the fuel trays and move therewith. They are positioned a spaced distance from the bottom of the trays, thereby providing a space for charcoal briquets 26 or other solid fuel.

In the use of the grill, the solid fuel is charged to the trays in their horizontal dashed-line positions. The trays then are swung upwardly about pivots 12 to their vertical full line positions, a suitable draft is established by opening drawer 18 and damper 20 and, with the assistance of lighter fluid, paper or other starting materials, the briquets are ignited.

After the fire is burning, the trays are pivoted downwardly to the cooking position of the grill.

If conventional practice were to be followed at the conclusion of the cooking operation, the fuel would be permitted to burn out, or it would be dumped out and wasted. Thereafter the grill would be permitted to cool, the trays and handles swung upwardly, and the grill carried to its new location.

As noted above, the present invention eliminates the necessity for waiting for the fuel to burn out and the grill to cool. It also preserves the unburned fuel so it may be used another time. This is accomplished by inserting the grill in a specially designed air-tight pouch and extinguishing the fire.

The pouch is generally rectangular in configuration to suit the contour of the grill. It is of sufficient size to contain the grill completely with the side walls of the pouch spaced apart from the side walls of the grill, FIGS. 2 and 3.

The pouch thus includes a pair of opposite side panels 30, a pair of opposite end panels 32, a top panel 34 and a bottom panel 36.

The pouch may be made from various suitable materials, preferably from tough, strong, air-tight, fire-resistant, fabric of natural or synthetic fibers. Canvas-like materials are particularly well suited for use as fabrics.

To lend stiffness to the bottom portion of the pouch, to lend added support, and to stabilize the grill when it is inserted in the pouch, the bottom of the pouch is made in two plies, FIG. 4, the space between the plies is used to confine a piece of stiff structural material 38. This may comprise a piece of plywood cut to fit snugly within the pocket.

Further to stiffen the lower portion of the pouch, the fabric of which the side panels is composed is used in a double ply, thereby providing pockets which contain flat, stiff structural elements 40. These elements, like element 38, may comprise pieces of plywood. They are maintained in position by suitable means such as rivets 42.

All of the panels preferably are reinforced and rendered air-tight by having bonded to their interior surfaces a sheet 44 of an impervious material such as sheet plastic.

Also to improve the fire resistance of the pouch, the interior surfaces of the side panels may be protected by sheets 46 of a non-flammable material such as asbestos cloth. Surprisingly, the side panels only need be thus protected, although fire-resistant layers also may be applied to the end, top and bottom panels as well if it is desired to do so.

An alternate heat-resistant liner is illustrated in FIG. 5. It comprises a piece of sheet aluminum 48 or other appropriate metallic material, used in place of the asbestos cloth.

All of the panels are interconnected and pieced into the final pouch, preferably by sewing them together using threads 50.

The pouch is provided with handles 52 sewn to its sidewalls. These are used in carrying the pouch with its grill contents.

The pouch further is provided with a substantial opening sized to pass the entire grill so that it conveniently may be inserted into the pouch and withdrawn therefrom.

As is evident particularly in FIG. 3, this opening extends longitudinally the length of the top panel 34 and downwardly continuously along end panels 32. Preferably the opening is located centrally of these panels.

The opening is provided with air-tight closure means which is adjustable between open and closed positions. The closure means preferably comprises a zipper 54 although burr-type fasteners, snap fasteners and the like also may be employed.

OPERATION

In the use of the hereindescribed grill-pouch assembly, the grill with its content of burning fuel first is adjusted to the solid line position of FIG. 1.

Zipper 54 is unzipped so that the two halves of the pouch may be separated widely. Thereafter the grill is inserted into the pouch to its dashed line position of FIGS. 2 and 3.

It is to be observed that in this position it is supported on legs 16. The legs in turn bear against the bottom and side panels of the pouch in the areas where these panels are reinforced by structural members 38, 49. The structural members thus brace and position the grill so that its sides are maintained spaced from the sides of the pouch.

Closure 54 then is closed. This seals the pouch against access of air with the result that the burning fuel quickly is extinguished. In practice, only about three minutes is required for the fuel to be completely extinguished, as determined by reopening the pouch and inspecting the condition of the fuel. In view of this fact, and also in view of the fact that the grill is maintained in a condition spaced from the side panels of the pouch, the extinguishing process occurs without scorching or otherwise damaging the fabric of which the cloth is made. This is true even though the grill is red hot when placed in the pouch.

Once the grill is within the pouch and the closure sealed, the pouch with its contents may be carried conveniently and safely to its new location. When it is desired to reuse the grill, it will be found to contain its unburned fuel in a usable condition with the result that a single charge of fuel may be used for several cookouts.

Having thus described my invention in preferred embodiments, I claim:

1. A self-extinguishing hibachi-type grill comprising, in combination:
   (a) an hibachi-type grill having a pair of fuel trays secured pivotally to a base for adjustment between an operative position extending horizontally outward to opposite sides of said base and an inoperative, folded position extending vertically upward from said base, each tray having a superimposed solid-fuel retaining cooking support, the grill further having a pair of legs on the base which extend downward and outward from the base so that their bottoms are spaced apart a distance substantially greater than the corresponding width of the base and folded trays, and
   (b) a fuel-extinguishing pouch of flexible, substantially air-tight sheet material dimensioned to contain the grill in its folded condition with burning solid fuel in the trays retained by the cooking supports, the pouch comprising:
      (1) a pair of opposed side panels, a bottom panel and a top panel,
      (2) stiff structural members secured to the inside of the bottom panel and lower portions of the side panels, the structural members on the side panels being spaced apart a distance substantially equal to the distance between the bottoms of the legs of the grill, for abutment of said bottom and side structural members by the bottoms of the legs of the grill, whereby to brace and position the folded grill so that its sides are maintained spaced inwardly from the side panels of the pouch,
      (3) a sheet of fire resistant material secured to the inner surfaces of the side panels of the pouch above said stiff structural members,
      (4) a longitudinal opening extending across the top panel and downward along the side panels sufficiently to pass the grill therethrough, and
      (5) substantially air-tight closure means secured to the top and side panels along the margins of said opening for opening and closing the pouch.

* * * * *